(12) United States Patent
Yamasaki et al.

(10) Patent No.: US 10,316,111 B2
(45) Date of Patent: Jun. 11, 2019

(54) CONJUGATED DIENE-BASED POLYMER, METHOD FOR PRODUCING THE SAME, AND COMPOSITION INCLUDING THE SAME

(71) Applicants: Japan Elastomer Co., Ltd., Tokyo (JP); Asahi Kasei Kabushiki Kaisha, Tokyo (JP)

(72) Inventors: Hideki Yamasaki, Tokyo (JP); Shouzou Akagi, Tokyo (JP)

(73) Assignees: Asahi Kasei Kabushiki Kaisha, Tokyo (JP); Japan Elastomer Co., Ltd., Tokyo (JP)

( * ) Notice: Subject to any disclaimer, the term of this patent is extended or adjusted under 35 U.S.C. 154(b) by 54 days.

(21) Appl. No.: 15/315,445

(22) PCT Filed: Jun. 1, 2015

(86) PCT No.: PCT/JP2015/065787
§ 371 (c)(1),
(2) Date: Dec. 1, 2016

(87) PCT Pub. No.: WO2015/186667
PCT Pub. Date: Dec. 10, 2015

(65) Prior Publication Data
US 2017/0190805 A1 Jul. 6, 2017

(30) Foreign Application Priority Data
Jun. 2, 2014 (JP) .................. 2014-114329

(51) Int. Cl.
C08C 19/22 (2006.01)
C08C 19/44 (2006.01)
C08C 19/02 (2006.01)
C08L 101/00 (2006.01)
C08L 15/00 (2006.01)
C08L 53/02 (2006.01)
C08F 293/00 (2006.01)
C08L 9/06 (2006.01)

(52) U.S. Cl.
CPC ............. *C08C 19/02* (2013.01); *C08C 19/22* (2013.01); *C08C 19/44* (2013.01); *C08F 293/005* (2013.01); *C08L 9/06* (2013.01); *C08L 15/00* (2013.01); *C08L 53/025* (2013.01); *C08L 101/00* (2013.01)

(58) Field of Classification Search
CPC ................... C08F 8/30; C08C 19/22
See application file for complete search history.

(56) References Cited

U.S. PATENT DOCUMENTS

| 2011/0288200 A1 | 11/2011 | Luo | |
|---|---|---|---|
| 2014/0187693 A1* | 7/2014 | Tsuji | C08K 3/04 524/186 |
| 2015/0298112 A1 | 10/2015 | Araki et al. | |

FOREIGN PATENT DOCUMENTS

| EP | 2716663 A1 | 4/2014 |
|---|---|---|
| JP | S61-268702 A | 11/1986 |
| JP | S61-296001 A | 12/1986 |
| JP | S62-030104 A | 2/1987 |
| JP | S63-099257 A | 4/1988 |
| JP | 2003-201312 A | 7/2003 |
| JP | 2004-099662 A | 4/2004 |
| JP | 2005-255942 A | 9/2005 |
| JP | 2005-272696 A | 10/2005 |
| JP | 2008-127481 A | 6/2008 |
| JP | 2009-114308 A | 5/2009 |
| JP | WO2014/065283 A1 | 5/2014 |
| RU | 2543165 C2 | 2/2013 |

OTHER PUBLICATIONS

International Search Report issued in corresponding International Patent Application No. PCT/JP2015/065787 dated Jul. 28, 2015.
International Preliminary Report on Patentability and Written Opinion issued in corresponding International Patent Application No. PCT/JP2015/065787 dated Dec. 6, 2016.
European Search Report issued in corresponding European Patent Application No. 15802610.4 dated Apr. 10, 2017.

* cited by examiner

*Primary Examiner* — Jeffrey C Mullis
(74) *Attorney, Agent, or Firm* — Morgan, Lewis & Bockius LLP (57) ABSTRACT

The present invention provides a conjugated diene-based polymer containing at least one conjugated diene monomer, wherein 40% or more of the end thereof has an amino group and an amide group, and the indicator b* value of yellowness, as measured with a colorimetric color difference meter, is 15 or less.

13 Claims, 1 Drawing Sheet

CONJUGATED DIENE-BASED POLYMER, METHOD FOR PRODUCING THE SAME, AND COMPOSITION INCLUDING THE SAME

TECHNICAL FIELD

The present invention relates to a conjugated diene-based polymer, a method for producing the polymer and the like.

BACKGROUND ART

A conjugated diene-based polymer or a hydrogenated conjugated diene-based polymer has been heretofore used as a modifier that improves impact resistance, low-temperature properties, processability and the like of a thermoplastic resin, because of being excellent in rebound resilience and low-temperature properties, and a composition including such a polymer has been heretofore widely used in the fields of electrical/electronic components, automobile components, various industrial components, daily commodities and the like. Polymer substances different from each other in structure, however, are not generally good in compatibility and are insufficient in affinity, and therefore are sometimes poorly dispersed in each other, resulting in deteriorations in mechanical properties of a composition, and poor appearance.

There has been heretofore proposed a method of providing a composition having excellent characteristics by an enhancement in affinity of polymer substances different from each other in structure. For example, a method is reported in which a polymer reaction of two polymer substances essentially incompatible produces a graft copolymer and the copolymer is interposed to increase the adhesion strength at the interface between different polymer substances, thereby allowing excellent characteristics in practical use to be exhibited. Specifically, there is disclosed the following: a terminal functional group of a conjugated diene-based polymer or a hydrogenated conjugated diene-based polymer and a polar group of a thermoplastic resin react with each other to form a graft copolymer, thereby providing a composition having excellent mechanical properties and adhesiveness (Patent Literatures 1, 2 and 3).

In particular, a hydrogenated conjugated diene-based polymer having a nitrogen-containing functional group at an end thereof is excellent in not only rebound resilience, low-temperature properties and compatibility, but also heat resistance and weather resistance, and therefore is widely used as a modifier of a thermoplastic resin and a rubber polymer, in particular, a polymer substance such as an engineering resin having high heat deformation resistance.

A composition including such a hydrogenated conjugated diene-based polymer having an end modified is compounded with, in addition to various stabilizers and reinforcing agents, a pigment, a dye, a colorant or the like to be thereby colored, and thereafter is subjected to a step of extrusion molding, injection molding or the like to be thereby formed into a final molded product.

LIST OF PRIOR ART DOCUMENTS

Patent Literature

Patent Literature 1: Japanese Patent Laid-Open No. 63-99257
Patent Literature 2: Japanese Patent Laid-Open No. 2003-201312
Patent Literature 3: Japanese Patent Laid-Open No. 2004-99662

SUMMARY OF INVENTION

Technical Problems to be Solved by the Invention

Such a conjugated diene-based polymer by itself, however, has the problems of yellowing and strong odor.

Therefore, it is difficult to use a composition of such a conjugated diene-based polymer and a polymer substance such as a thermoplastic resin to stably provide a colored molded product that has excellent mechanical properties and appearance properties (transparency, or high whiteness) such as color tone and that also is excellent in physical property balance between such properties, and there is still room for improvement.

Solution to Problem

The present inventors have made intensive studies in view of the above problem, and as a result, have found that 40% or more of the end of a conjugated diene-based polymer has a specified structure to thereby provide a conjugated diene-based polymer having an excellent color tone. The present inventors have further found that a composition of the conjugated diene-based polymer and a polymer substance such as a thermoplastic resin is excellent in mechanical properties (such as impact resistance) and appearance properties such as color tone, and is also excellent in physical property balance between such properties.

The present inventors have also found that a method including a step of polymerizing a monomer containing at least one conjugated diene monomer by use of a organo-lithium compound as an initiator and a step of adding a urea derivative having a specified structure so that the ratio of lithium of the polymerization initiator and the urea derivative is within a specified range provides a conjugated diene-based polymer that has an amino group of a specified structure at a main end thereof and that is excellent in mechanical properties and appearance properties, leading to completion of the present invention.

That is, the present invention is as follows.

1. A conjugated diene-based polymer comprising at least one conjugated diene monomer, wherein 40% or more of an end thereof is an end having an amino group and an amide group, and an indicator b* value of yellowness, as measured with a colorimetric color difference meter, is 15 or less.
2. The conjugated diene-based polymer according to the above 1, wherein the end having the amino group and the amide group comprises an end having a structure represented by the following formula (I), and the indicator b* value of yellowness, as measured with a colorimetric color difference meter, is 15 or less:

wherein P represents a conjugated diene-based polymer comprising at least one conjugated diene monomer, and $R_1$ and $R_2$ each independently represent a hydrocarbon group having 1 to 20 carbon atoms.

3. The conjugated diene-based polymer according to the above 1 or 2, wherein the end having the amino group and the amide group comprises an end having a structure represented by the following formula (I) and an end having a structure represented by the following formula (IV), and the indicator b* value of yellowness, as measured with a colorimetric color difference meter, is 15 or less:

(I)

wherein P represents a conjugated diene-based polymer comprising at least one conjugated diene monomer, and $R_1$ and $R_2$ each independently represent a hydrocarbon group having 1 to 20 carbon atoms; and (IV)

wherein P represents a conjugated diene-based polymer comprising at least one conjugated diene monomer, and $R_1$ and $R_2$ each independently represent a hydrocarbon group having 1 to 20 carbon atoms.

4. The conjugated diene-based polymer according to any of the above 1 to 3, wherein the b* value is 9 or less.

5. A method for producing a conjugated diene-based polymer, comprising:

a step of polymerizing a monomer including at least one conjugated diene monomer by use of an organolithium compound as an initiator, and a step of adding a compound (II) represented by the following formula (II) and a compound (III) represented by the following formula (III):

(II)

wherein $R_3$ and $R_4$ each independently represent a hydrocarbon group having 1 to 20 carbon atoms; and (III)

wherein $R_5$ and $R_6$ each independently represent a hydrocarbon group having 1 to 20 carbon atoms;

wherein when a weight ratio (%) of the compound (II) to a total of the compound (II) and the compound (III) is defined as (A) as shown by formula 1 and a molar ratio of the compound (II) and the compound (III) to lithium of the polymerization initiator is defined as (B) as shown by formula 2, amounts of the polymerization initiator, the compound (II) and/or the compound (III) to be added are regulated so that (A)×(B) is 0.5 or less as shown by formula 3:

$(A)$=(Compound (II)/(Compound (II)+Compound (III)))×100    Formula 1:

$(B)$=([Compound (II)]+[Compound (III)])/[Li]    Formula 2:

$(A)×(B)≤0.5.$    Formula 3:

6. A polymer composition comprising:

(a) 1 to 99 parts by weight of the conjugated diene-based polymer according to any of the above 1 to 4 or a conjugated diene-based polymer obtained by the method according to the above 5, and (b) 99 to 1 part by weight of a thermoplastic polymer and/or a rubber polymer.

Advantageous Effects of Invention

The conjugated diene-based polymer of the present invention has an excellent color tone and is low in odor, and furthermore the conjugated diene-based polymer can be blended with other polymer substance such as a thermoplastic resin and a rubber polymer to thereby provide a composition that is excellent in mechanical properties such as impact resistance and appearance properties such as color tone, and that is also excellent in physical property balance between such properties.

DESCRIPTION OF EMBODIMENTS

Hereinafter, an embodiment for carrying out the present invention (hereinafter, referred to as "present embodiment".) is described, but the present invention is not limited to the following embodiment and can be variously modified within the scope thereof and carried out.

(Conjugated Diene-Based Polymer)

A conjugated diene-based polymer of the present embodiment includes at least one conjugated diene monomer. As the conjugated diene monomer, 1,3-butadiene, isoprene, 2,3-dimethyl-1,3butadiene, 1,3-pentadiene, 1,3-heptadiene, and the like can be used.

The conjugated diene-based polymer herein may be a polymer including only a conjugated diene monomer, or may be a random copolymer or a block copolymer of a conjugated diene monomer and a vinyl aromatic compound. As the vinyl aromatic compound, for example, styrene, α-methylstyrene, p-methylstyrene, 2-vinylnaphthalene, divinylbenzene, and the like can be used. The content of the vinyl aromatic compound in the copolymer is 90% by weight or less, preferably 60% by weight or less, particularly preferably 40% by weight or less in terms of the improvement effect of rebound resilience.

Examples of the method for producing the block copolymer include methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 51-49567 and Japanese Patent Laid-Open No. 59-166518. Examples of the structure of the block copolymer include those represented by general formulae (A-B)n, (A-B)n-A and B-(A-B)n (in the general formulae, A represents a polymer block mainly including a vinyl aromatic compound, B represents a polymer block mainly including a conjugated diene, the interface between the block A and the block B is not necessarily clearly distinguished, and n represents an integer of 1 or more, preferably an integer of 1 to 5).

The polymer block A mainly including a vinyl aromatic compound represents a copolymer block of a vinyl aromatic compound and a conjugated diene, containing 50% by weight or more, preferably 70% by weight or more of the vinyl aromatic compound, and/or a vinyl aromatic hydrocarbon homopolymer block. The polymer block B mainly including a conjugated diene represents a copolymer block of a conjugated diene and a vinyl aromatic compound, containing 50% by weight or more, preferably 60% by weight or more of the conjugated diene, and/or a conjugated diene homopolymer block. The vinyl aromatic compound in the copolymer block may be distributed uniformly or in a tapered manner. In the copolymer block portion, a plurality of portions where the vinyl aromatic compound is distributed uniformly and/or a plurality of portions where the vinyl aromatic compound is distributed in a tapered manner may coexist. Furthermore, in the copolymer block portion, a plurality of portions each having a different content of the vinyl aromatic compound may coexist. The block copolymer for use in the present invention may be any mixture of the block copolymers represented by the above general formulae.

In the present embodiment, when a rubber polymer good in flexibility or a resin polymer composition excellent in a balance between impact resistance and rigidity is obtained, it is recommended that the proportion of a vinyl aromatic compound polymer block incorporated in the block copolymer (referred to as the rate of the vinyl aromatic compound block) be adjusted to 50% by weight or more, preferably 70 to 97% by weight. The rate of the vinyl aromatic compound block incorporated in the block copolymer is measured by a method in which the block copolymer is subjected to oxidative decomposition by tert-butyl peroxide with osmium tetraoxide as a catalyst (method described in I. M. KOLTHOFF, et al., J. Polym. Sci. 1, 429 (1946)).

The microstructure (ratio of cis, trans and vinyl) of the conjugated diene-based polymer of the present embodiment can be arbitrarily changed depending on a polar compound to be used, as described later. It is recommended that when 1,3-butadiene is used as the conjugated diene, the amount of a 1,2-vinyl bond be 10 to 80% by weight, preferably 25 to 75% by weight, and when isoprene is used or 1,3-butadiene and isoprene are used as the conjugated diene, the total amount of a 1,2-vinyl bond and a 3,4-vinyl bond be 3 to 80% by weight, preferably 5 to 70% by weight.

In the conjugated diene-based polymer of the present embodiment, 40% or more of the end thereof has an amino group and amide group. A conjugated diene-based polymer in which 40% or more of the end has an amino group and an amide group is preferably produced by a reaction of urea derivatives (compound (II) and compound (III)) having a specified structure, described later.

In one aspect of the present embodiment, the conjugated diene-based polymer preferably includes an end having a structure represented by the following formula (I) as the end having an amino group and an amide group, and 40% or more of the end of the conjugated diene-based polymer may have a structure represented by the following formula (I).

wherein P represents a conjugated diene-based polymer containing at least one conjugated diene monomer, and $R_1$ and $R_2$ each independently represent a hydrocarbon group having 1 to 20 carbon atoms.

In the conjugated diene-based polymer of the present embodiment, preferably 50% or more, further preferably 60% or more of the end thereof has the structure represented by the formula (I). In the formula (I), $R_1$ and $R_2$ preferably each independently represent a hydrocarbon group having 1 to 8 carbon atoms. The hydrocarbon group may have an unsaturated bond and/or a branched structure and is not particularly limited. Examples thereof include an alkyl group, a cycloalkyl group, an alkenyl group, an alkynyl group and an aryl group, and among them, an alkyl group is preferable and an alkyl group having 1 to 8 carbon atoms is more preferable.

The conjugated diene-based polymer has such a structure and therefore is improved in compatibility with other polymer substance (for example, a thermoplastic resin having a polar group), impact resistance, and the like. The end structure of the conjugated diene-based polymer can be analyzed by a GPC method described later.

In one aspect of the present embodiment, it is preferable that the conjugated diene-based polymer include an end having a structure represented by the following formula (I) and an end having a structure represented by the following formula (IV) as the end having an amino group and an amide group in all ends, and it is more preferable that the total of the end having the structure represented by the formula (I) and the end having the structure represented by the formula (IV) be 40% or more of the end of the conjugated diene-based polymer.

wherein P represents a conjugated diene-based polymer containing at least one conjugated diene monomer, and $R_1$ and $R_2$ each independently represent a hydrocarbon group having 1 to 20 carbon atoms.

wherein P represents a conjugated diene-based polymer containing at least one conjugated diene monomer, and $R_1$ and $R_2$ each independently represent a hydrocarbon group having 1 to 20 carbon atoms.

In one aspect of the present embodiment, the total of the end having the structure represented by the formula (I) and the end having the structure represented by the formula (IV) in all ends is more preferably 50% or more, further preferably 60% or more in the conjugated diene-based polymer. In the formula (I) and the formula (IV), $R_1$ and $R_2$ preferably each independently represent a hydrocarbon group having 1 to 8 carbon atoms.

The conjugated diene-based polymer has such a structure and therefore is improved in compatibility with other polymer substance (for example, a thermoplastic resin having a polar group), impact resistance, and the like. The end structure of the conjugated diene-based polymer can be analyzed by a GPC method described later.

In the conjugated diene-based polymer of the present embodiment, the indicator b* value (also simply designated as "b* value") of yellowness is 15 or less. An indicator b* value of more than 15 is not preferable because of impairing transparency of a composition with other polymer substance such as a thermoplastic resin having a polar group and also making it impossible to provide a colored molded product high in whiteness. The b* value is preferably 9 or less, more preferably 8 or less, further preferably 6 or less. The b* value is also preferably 0.5 or more, more preferably 0.8 or more.

The b* value can be controlled by reducing the content of a modified conjugated diene-based polymer represented by the formula (IV) described above. The content of the modified conjugated diene-based polymer represented by the formula (IV) can be controlled by adjusting the amount of compound (II) to be added in a step of adding compound (II) and compound (III) described later.

The indicator b* value of yellowness is measured with a colorimetric color difference meter, and specifically, can be measured by use of a conjugated diene-based polymer sample having a thickness of 3 mm with a color difference meter SM-7 type (45° diffusion type) manufactured by Suga Test Instruments Co., Ltd.

(Method for Producing Conjugated Diene-Based Polymer)

The conjugated diene-based polymer of the present embodiment described above can be produced by the following production method. That is, the method includes a step of polymerizing a monomer containing at least one conjugated diene monomer by use of an organolithium compound as an initiator, and a step of adding a compound (II) represented by the following formula (II) and a compound (III) represented by the following formula (III):

(II)

wherein $R_3$ and $R_4$ each independently represent a hydrocarbon group having 1 to 20 carbon atoms;

(III)

wherein $R_5$ and $R_6$ each independently represent a hydrocarbon group having 1 to 20 carbon atoms;

wherein when the weight ratio (%) of the compound (II) to the total of the compound (II) and the compound (III) is defined as (A) as shown by formula 1 and the molar ratio of the compound (II) and the compound (III) to lithium of the polymerization initiator is defined as (B) as shown by formula 2, the amounts of the polymerization initiator, the compound (II) and/or the compound (III) to be added are preferably regulated so that (A)×(B) is 0.5 or less as shown by formula 3:

(A)=(Compound (II)/(Compound (II)+Compound (III)))×100    Formula 1:

(B)=([Compound (II)]+[Compound (III)])/[Li]    Formula 2:

(A)×(B)≤0.5    Formula 3:

The lithium end of a conjugated diene-based polymer obtained by use of an organolithium compound as a polymerization initiator can be allowed to react with the compound (II) and the compound (III) in a condition where formula 3 is satisfied, and a proton donor such as an alcohol or water can be added after completion of the reaction to thereby provide a conjugated diene-based polymer in which 40% or more of the end thereof has a structure having an amino group and an amide group and the indicator b* value of yellowness, as measured with a colorimetric color difference meter, is 15 or less. The compound (II) and the compound (III) can be used to thereby allow the end of the conjugated diene-based polymer to have a structure represented by formula (I) or a structure represented by formula (IV).

After the proton donor such as an alcohol or water is added to terminate the reaction, a hydrogenation reaction described later may also be performed to thereby provide a hydrogenated conjugated diene-based polymer.

$R_3$ and $R_4$ in the formula (II), and $R_5$ and $R_6$ in the formula (III) each independently represent a hydrocarbon group having 1 to 20 carbon atoms, which may have an unsaturated bond and/or a branched structure and is preferably a hydrocarbon group having 1 to 8 carbon atoms. The hydrocarbon group is not particularly limited, examples thereof include an alkyl group, a cycloalkyl group, an alkenyl group, an alkynyl group and an aryl group, an alkyl group is preferable, and an alkyl group having 1 to 8 carbon atoms is more preferable.

In the present embodiment, as a solvent for use in production of the conjugated diene-based polymer, a hydrocarbon solvent, for example, an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as benzene, toluene, ethylbenzene or xylene can be used. Such solvents may be used singly or as a mixture of two or more.

Moreover, the organolithium compound for use in production of the conjugated diene-based polymer is a compound in which one or more lithium atoms are bound in the molecule, and examples thereof include ethyl lithium, n-propyl lithium, isopropyl lithium, n-butyl lithium, sec-butyl lithium, tert-butyl lithium, hexamethylene lithium, butadienyl dilithium and isoprenyl dilithium. These may be singly or in combination of two or more. The organolithium compound may also be added in one or more portions during polymerization in production of the conjugated diene-based polymer.

In the present embodiment, a polar compound and a randomizing agent can be used for the purpose of adjustment of the polymerization rate in production of the conjugated diene-based polymer, modification of a microstructure of a conjugated diene portion subjected to polymerization, adjustment of the reactivity ratio of a conjugated diene and a vinyl aromatic compound, and the like. Examples of the polar compound and the randomizing agent include ethers, amines, thioethers, phosphoramide, potassium salts or sodium salts of alkylbenzenesulfonic acids, and potassium or sodium alkoxides. Preferable ethers are dimethyl ether, diethyl ether, diphenyl ether, tetrahydrofuran, diethylene glycol dimethyl ether and diethylene glycol dibutyl ether. As such amines, tertiary amine, trimethylamine, triethylamine, tetramethylethylenediamine, other cyclic tertiary amine and the like can also be used. Phosphine and phosphoramide include triphenylphosphine and hexamethylphosphoramide.

In the present embodiment, the polymerization temperature in production of the conjugated diene-based polymer is −10 to 150° C., preferably 30 to 120° C. The time taken for polymerization, but varying depending on the condition, is within 48 hours, preferably 0.5 to 10 hours. In addition, the atmosphere in the polymerization system is preferably an atmosphere of an inert gas such as a nitrogen gas. The polymerization pressure may be within a pressure range sufficient for maintaining the monomer and the solvent in a liquid phase within the above polymerization temperature range, and is not particularly limited. Furthermore, it is preferable that impurities causing a catalyst and a living polymer to be inactivated, such as water, oxygen and carbon dioxide gas, be not incorporated in the polymerization system.

Examples of the compound (II) for use in the present embodiment include 1,3-diethyl-2-imidazolinone, 1,3-dimethyl-2-imidazolinone, 1,3-dipropyl-2-imidazolinone, 1-methyl-3-ethyl-2-imidazolinone, 1-methyl-3-propyl-2-imidazolinone, 1-methyl-3-butyl-2-imidazolinone and 1,3-dihydro-1,3-dimethyl-2H-imidazol-2-one. Examples of the compound (III) include 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-propyl-2-imidazolidinone and 1-methyl-3-butyl-2-imidazolidinone.

The ratio (A) of the compound (II) to the total of the compound (II) and the compound (III) is preferably 0.6% by weight or less, more preferably 0.3% by weight or less, further preferably 0.15% by weight or less.

The total amount of the compound (II) and the compound (III) to be added is preferably 0.4 to 2.0 mol based on 1 mol of lithium to be used. That is, the (B) represented by formula 2 preferably satisfies 0.4 (B) 2.0. The (B) is within the range to thereby provide a structure in which 40% or more of the end of the resulting conjugated diene-based polymer has an amino group and an amide group, and suppress coloration.

Addition of the compound (II) and the compound (III) may be performed at any time after the initiation of polymerization of the monomer constituting the conjugated diene-based polymer. When hydrogenation to the conjugated diene-based polymer is performed, such addition is preferably performed after the polymerization reaction of the monomer progresses and before hydrogenation is performed.

The production method of the present embodiment may include a step of performing hydrogenation, to provide a hydrogenated conjugated diene-based polymer. The hydrogenation catalyst for use in hydrogenation of the conjugated diene-based polymer is not particularly limited, and (1) a supported heterogeneous hydrogen catalyst in which a metal such as Ni, Pt, Pd or Ru is supported on carbon, silica, alumina, diatomaceous earth or the like, (2) a so-called Ziegler-type hydrogenation catalyst in which a transition metal salt, such as an organic acid salt or an acetylacetone salt of Ni, Co, Fe, Cr or the like, and a reducing agent such as organoaluminum are used, or (3) a homogeneous hydrogenation catalyst, for example, a so-called organometallic complex such as an organometallic compound of Ti, Ru, Rh, Zr or the like, these catalysts being conventionally known, is used. As a specific hydrogenation catalyst, any hydrogenation catalyst described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, and Japanese Patent Publication No. 2-9041 can be used. A preferable hydrogenation catalyst includes a mixture with a titanocene compound and/or a reducible organometallic compound.

As the titanocene compound, any compound described in Japanese Patent Laid-Open No. 8-109219 can be used. Specific examples thereof include a compound having at least one or more ligand having a (substituted) cyclopentadienyl backbone, an indenyl backbone or a fluorenyl backbone, such as biscyclopentadienyl titanium dichloride and monopentamethylcyclopentadienyl titanium trichloride. The reducible organometallic compound includes an organic alkali metal compound such as organolithium, an organomagnesium compound, an organoaluminum compound, an organoboron compound or an organozinc compound.

The hydrogenation reaction is preferably performed in the temperature range from 0 to 200° C., more preferably from 30 to 150° C. It is recommended that the pressure of hydrogen for use in the hydrogenation reaction be preferably 0.1 to 15 MPa, more preferably 0.2 to 10 MPa, further preferably 0.3 to 5 MPa. Also the hydrogenation reaction time is preferably 3 minutes to 10 hours, more preferably 10 minutes to 5 hours. The hydrogenation reaction can be performed by use of, for example, a batch process, a continuous process or a combination thereof.

In the present embodiment, when hydrogenation is performed, the total hydrogenation rate in the hydrogenated conjugated diene-based polymer can be arbitrarily selected according to the purpose and is not particularly limited. The unsaturated double bond based on the conjugated diene compound in the conjugated diene-based polymer may be preferably subjected to hydrogenation in an amount of 70% or more, more preferably 80% or more, particularly preferably 95% or more thereof, or only a part thereof may be subjected to hydrogenation. When only a part thereof is subjected to hydrogenation, it is recommended that the hydrogenation rate be 10% or more and less than 70%, 15% or more and less than 65%, or 20% or more and less than 60%, if desired. The hydrogenation rate of the hydrogenated conjugated diene-based polymer is measured by a nuclear magnetic resonance apparatus (NMR).

In the conjugated diene-based polymer of the present embodiment, a b* value of 9 or less is preferable because the proportion of the specified structure present at the end tends to be hardly changed before and after hydrogenation.

In the present invention, the weight average molecular weight of the conjugated diene-based polymer is preferably 30000 or more in terms of mechanical strength and impact resistance of the polymer composition, and is preferably 1000000 or less, more preferably 40000 to 800000, further preferably 50000 to 600000 in terms of processability, and compatibility with a polymer substance such as a thermoplastic resin. The weight average molecular weight of the conjugated diene-based polymer is determined by GPC measurement by use of the calibration curve determined from measurement of a commercially available standard polystyrene.

In the solution of the conjugated diene-based polymer obtained as described above, a catalyst residue can be if necessary removed to separate the polymer from the solution. Examples of the method of separating the solvent can include a method in which a polar solvent serving as a poor solvent to the polymer, such as acetone or an alcohol, is added to the solution after polymerization or hydrogenation to precipitate and recover the polymer, a method in which the solution of the polymer is loaded to hot water with stirring and the solvent is removed and recovered by steam stripping, or a method in which the polymer solution is directly heated to distill off the solvent. To the conjugated diene-based polymer recovered can be added various stabilizers such as a phenol-based stabilizer, a phosphorous stabilizer, a sulfurous stabilizer and an amine-based stabilizer.

Such a stabilizer is preferably added in an amount of 0.02 to 0.5 parts by mass, more preferably 0.05 to 0.4 parts by mass based on 100 parts by mass of the conjugated diene-based polymer.

The stabilizer is preferably a hindered phenol-based stabilizer, and examples thereof include octadecyl-3-(3,5-di-tert-butyl-4-hydroxyphenyl)propionate, pentaerythrityl-tetrakis[3-(3,5-di-tert-butyl-4-hydroxyphenyl)propionate], triethylene glycol-bis[3-(3-tert-butyl-5-methyl-4-hydroxyphenyl)propionate], 1,3,5-trimethyl-2,4,6-tris(3,5-di-tert-butyl-4-hydroxybenzyl)benzene, 2,4-bis(octylthiomethyl)-o-cresol and 2,4-bis(2'-acetyloxyethylthiomethyl)-3,6-dimethylphenol.

(Polymer Composition)

A polymer composition of the present embodiment includes a component (a) that is a conjugated diene-based polymer in which 40% or more of the end thereof has a structure having an amino group and an amide group and the indicator b* value of yellowness, as measured with a colorimetric color difference meter, is 15 or less, and a component (b) that is at least one selected from the group consisting of a thermoplastic resin and a rubber polymer. With respect to the composition, the component (a) is included in the range from 1 to 99 parts by weight and the component (b) is included in the range from 99 to 1 part by weight, preferably the component (a) is included in the range from 5 to 95 parts by weight and the component (b) is included in the range from 95 to 5 parts by weight, and any range suitable for various molding materials can be selected.

When the conjugated diene-based polymer of the present embodiment and a thermoplastic resin are blended, a polymer composition excellent in impact resistance and fabricability, and appearance properties such as color tone is obtained. The thermoplastic resin includes a block copolymerization resin of a conjugated diene compound and a vinyl aromatic compound, a polymer of a vinyl aromatic compound, a copolymerization resin of a vinyl aromatic compound and other vinyl monomer such as ethylene, propylene, butylene, vinyl chloride or vinylidene chloride, a rubber-modified styrene-based resin (HIPS), an acrylonitrile-butadiene-styrene copolymerization resin (ABS), a methacrylic acid ester-butadiene-styrene copolymerization resin (MBS), an olefin-based polymer, a cyclic olefin-based resin such as an ethylene-norbornene resin, a polybutene-based resin, a polyvinyl chloride-based resin, a polyvinyl acetate-based resin, polymers of acrylic acid as well as an ester and an amide thereof, a polyacrylate-based resin, polymer(s) of acrylonitrile and/or methacrylonitrile, a nitrile resin as a copolymer with other copolymerizable monomer containing 50% by weight or more of such an acrylonitrile-based monomer, a polyamide-based resin, a polyester-based resin, a thermoplastic polyurethane-based resin, a polycarbonate-based resin, thermoplastic polysulfone such as polyethersulfone and polyallylsulfone, a polyoxymethylene-based resin, a polyphenylene ether-based resin, a polyphenylene sulfide-based resin, a polyacrylate-based resin, a polyketone-based resin, a fluororesin, a polyurethane-based resin, a polyimide-based resin and a polybutadiene-based resin.

The rubber polymer includes olefin-based elastomers such as a butadiene rubber and a hydrogenated product thereof, a styrene-butadiene rubber and a hydrogenated product thereof, an isoprene rubber, an acrylonitrile-butadiene rubber and a hydrogenated product thereof, a chloroprene rubber, an ethylene-propylene rubber, an ethylene-propylene-diene rubber, an ethylene-butene-diene rubber, an ethylene-butene rubber, an ethylene-hexene rubber and an ethylene-octene rubber, a butyl rubber, an acrylic rubber, a fluororubber, a silicone rubber, a chlorinated polyethylene rubber, an epichlorohydrin rubber, an α,β-unsaturated nitrile-acrylic acid ester-conjugated diene copolymerization rubber, a urethane rubber, a polysulfide rubber, styrene-based elastomers such as a styrene-butadiene block copolymer and a hydrogenated product thereof, a natural rubber, ester-based thermoplastic elastomers such as a polyether/ester copolymer and a polyester/ester copolymer, amide-based thermoplastic elastomers in which polyamide 6, 66, 11 or 12 is used as a hard segment and polyether, polyester or the like is used as a soft segment, polyester-polyether-based elastomers, and urethane-based thermoplastic elastomers including a hard segment having diisocyanate and a short chain glycol or the like and a soft segment having diisocyanate and a long chain glycol or the like.

Moreover, such thermoplastic resins and rubber polymers may be if necessary used in combination of two or more. Such a combination is not particularly limited, and a combination of thermoplastic resin components, a combination of rubber polymer components, or a combination of a thermoplastic resin and a rubber polymer may be used. In the present embodiment, it is noted that the conjugated diene-based polymer corresponding to the component (a) does not correspond to the component (b).

Any additive can also be compounded in the polymer composition of the present invention, if necessary. The type of the additive is not particularly limited as long as such an additive is generally used for compounding of the thermoplastic resin and the rubber polymer. Examples of the additives include inorganic filler such as metal hydroxide, a silica-based inorganic filler and metal oxide, organic filler, an antioxidant, an ultraviolet absorber, a light stabilizer, a lubricant such as stearic acid, behenic acid, zinc stearate, calcium stearate, magnesium stearate and ethylenebisstearamide, a release agent, paraffin, a plasticizer, a flame retardant, an antistatic agent, a reinforcing material such as an organic fiber, a carbon fiber and a metal whisker, a pigment, and a colorant.

In the method for producing a polymer composition of the present invention, a known method can be utilized without any particular limitation. For example, a melt-kneading method in which a common mixer such as a Banbury mixer, a short-axial screw extruder, a biaxial screw extruder, a co-kneader or a multi-axial screw extruder is used, or a method in which respective components are dissolved or dispersed and mixed, and a solvent is removed by heating is used. A melt-kneading method by an extruder is preferable in terms of productivity and good kneadability. The shape of the resulting polymer composition is not particularly limited, and can include pellet, sheet, strand, and chip shapes. After melt-kneading, a molded article can also be directly made.

The polymer composition of the present invention as it is or a composition thereof to which various additives are compounded can be processed to a molded article useful in practical use by a conventionally known method such as extrusion molding, injection molding, two-color injection molding, sandwich molding, hollow molding, compression molding, vacuum molding, rotational molding, powder slush molding, foam molding, lamination molding, calender molding or blow molding. In addition, processing such as foaming, powdering, stretching, adhesion, printing, coating or plating may be if necessary applied. Such a molding method can allow the resulting molded article to serve as a wide variety of molded articles such as a sheet, a film, injection molded articles having various shapes, a hollow molded article, a vacuum molded article, an extrusion-molded article, a foam-molded article, non-woven fabric and fibrous molded articles, and synthetic leather. Such molded articles can be utilized for food packaging materials, medical equipment materials, home electric appliances and components thereof, electronic devices and components thereof, automobile components, industrial components, household appliances, materials for toys and the like, materials for footwear, materials for viscous adhesives/adhesives, asphalt modifiers, and the like.

EXAMPLES

1. Weight Ratio (% by Weight) of Compound (II)

Figure 1:
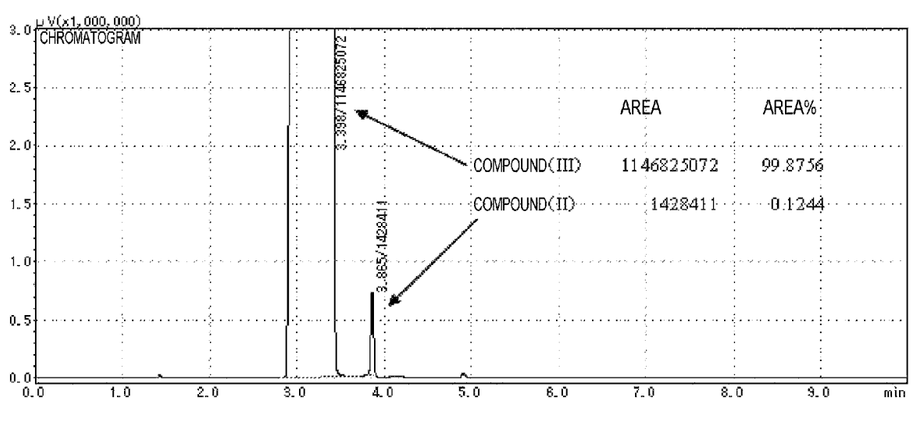
The FIGURE illustrates one example of results of gas chromatography measurement performed for determination of the weight ratio (% by weight) of compound (II) to a total of compound (II) and compound (III).

The weight ratio (% by weight) of the compound (II) to the total of the compound (II) and the compound (III) was determined by measurement according to the following gas chromatography measurement conditions (one example of the measurement result is illustrated in FIG. 1.) and calculation from the peak area ratio.

The gas chromatography measurement conditions are shown below.

Apparatus: gas chromatogram (GC-2014, detector: FID) manufactured by Shimadzu Corporation Column: capillary column manufactured by J&W Technology Limited (DB-WAX 30 m×025 mm, 0.25 μm)

Split ratio: 1/20

Amount injected: 2 μL

Linear speed: 25 cm/sec

Temperature rise condition: 200° C. (kept for 10 minutes)

Inlet temperature: 200° C.

Detector temperature: 200° C.

2. Characteristics of Conjugated Diene-Based Polymer Before Hydrogenation (1) Content of Styrene Bound The content (% by weight) of styrene bound was measured by absorption of a phenyl group of styrene at UV 254 nm with a styrene/butadiene block copolymer before hydrogenation as a specimen and a chloroform solution as a sample. (V-550 manufactured by JASCO Corporation)

(2) Amount of Vinyl of Butadiene Portion

The amount of vinyl of a butadiene portion was determined by using a carbon disulfide solution as a sample, using a solution cell to measure an infrared spectrum in the range from 600 to 1000 $cm^{-1}$, and using a predetermined absorbance to determine the microstructure of each butadiene portion of a styrene/butadiene block copolymer according to the calculation equation of the Hampton method and that of polybutadiene according to the calculation equation of the Morello method. "Spectrum 100 manufactured by PerkinElmer Co., Ltd." was used as an IR spectral analyzer.

(3) Peak Molecular Weight

The peak molecular weight was determined by measuring GPC (2695 manufactured by WATERS) chromatogram with a polystyrene-based gel column (column: PLgel MiniMix-C×three columns, column oven temperature: 35° C.: 865-CO manufactured by JASCO Corporation, THF flow rate: 0.35 mL, sample concentration: 0.1% by weight, amount injected: 50 μL, RI detector: 2414 manufactured by WATERS) by use of, as a specimen, a copolymer before addition of a nitrogen-containing cyclic compound. In addition, the weight average molecular weight and the number average molecular weight were determined from the resulting GPC chromatogram by use of the calibration curve created with a commercially available standard monodisperse polystyrene having a known molecular weight, to provide the molecular weight distribution value.

(4) Coupling Rate

The coupling rate was determined by measuring GPC (2695 manufactured by WATERS) chromatogram with a polystyrene-based gel column (column: PLgel MiniMix-C× three columns, column oven temperature: 35° C.: 865-CO manufactured by JASCO Corporation, THF flow rate: 0.35 mL, sample concentration: 0.1% by weight, amount injected: 50 μL, RI detector: 2414 manufactured by WATERS) by use of, as a specimen, polybutadiene before addition of a nitrogen-containing cyclic compound. The coupling rate was calculated from the ratio of the peak area (peak at a lower molecular weight) of one not coupled and the peak area (peak at a higher molecular weight) of one coupled.

3. Characteristics of Conjugated Diene-Based Polymer (1) Amount of Hydrogen Added to Polybutadiene Portion (Hydrogenation Rate: % by Weight)

The amount was measured by use of a nuclear magnetic resonance apparatus (DPX-400 manufactured by BRUKER Corporation).

(2) Rate of Amino Group of Specified Structure at End: % by Weight

The property, adsorption of a component having an amino group of a specified structure at an end thereof to a GPC column with a silica-based gel as a filler, was applied, a sample solution including a measurement sample and a standard polystyrene having a molecular weight of 5000 (polystyrene did not adsorb to the column) was used to measure both GPC (2695 manufactured by WATERS) chromatogram with a polystyrene-based gel column (column: PLgel MiniMix-C×three columns, column oven temperature: 35° C.: 865-CO manufactured by JASCO Corporation, THF flow rate: 0.35 mL, RI detector: 2414 manufactured by WATERS) and GPC (2695 manufactured by WATERS) chromatogram with a silica-based gel column (column: ZorbaxPSM1000-S: one column, PSM300-S: one column and PSM60-S: one column (three columns in total), column oven temperature: 35° C.: 865-CO manufactured by JASCO Corporation, THF flow rate: 0.7 mL/min, RI detector: 2414 manufactured by Waters) by use of an RI detector, and the difference between such chromatograms was used to determine the amount of adsorption to the silica column, thereby determining the rate of the total of the end as the amino group represented by the formula (I) and the end as the amino group represented by the formula (IV). Hereinafter, the amino group represented by the formula (I) and the amino group represented by the formula (IV) may also be each designated as "amino group of specified structure".

Ten mg of the sample was dissolved together with 5 mg of standard polystyrene in 20 mL of THF, and 100 µL of the resultant was injected for measurement. With respect to a specific procedure, the rate was calculated from the areas (%) measured in the polystyrene-based gel column and the silica-based gel column according to the following formula.

$$\text{Rate (\%) of amino group of specified structure at end} = \frac{(a/b) - (c/d)}{(a/b)} \times 100$$

a: Area (%) of all polymers measured in polystyrene-based gel (PLgel)
b: Area (%) of low molecular weight internal standard PS (polystyrene) measured in polystyrene-based gel (PLgel)
c: Area (%) of all polymers measured in silica-based column (Zorbax)
d: Area (%) of low molecular weight internal standard PS measured in silica-based column (Zorbax)

(3) b* Value of Conjugated Diene Polymer

The b* value was measured by use of a color difference meter SM-7 type (45° diffusion type) manufactured by Suga Test Instruments Co., Ltd.

4. Preparation of Hydrogenation Catalyst

The hydrogenation catalyst used in the hydrogenation reaction was prepared by the following method.

(1) Hydrogenation Catalyst I

To a reaction vessel purged with nitrogen was loaded 1 L of cyclohexane dried and purified, 100 mmol of dichlorobis (η5-2,4-cyclopentadiene-1-yl)titanium was added thereto, and a n-hexane solution including 200 mmol of trimethyl aluminum was added thereto with sufficient stirring and subjected to a reaction at room temperature for about 3 days.

(2) Hydrogenation Catalyst II

To a reaction vessel purged with nitrogen was loaded 2 L of cyclohexane dried and purified, 40 mmol of bis(η5-cyclopentadienyl)titanium di-(p-tolyl) and 150 g of 1,2-polybutadiene having a molecular weight of about 1,000 (amount of 1,2vinyl bond: about 85%) were dissolved therein, a cyclohexane solution including 60 mmol of n-butyl lithium was added thereto and subjected to a reaction at room temperature for 5 minutes, and n-butanol was immediately added thereto and stirred, and kept at room temperature.

5. Odor Sensory Evaluation of Conjugated Diene-Based Polymer

To a glass bottle was loaded 20 g of a block copolymer composition, the bottle was lidded by an aluminum foil or the like, heated by a heating drier at 160° C. for 30 minutes, and thereafter taken out from the heating drier and capped with a lid having heat resistance, and left to still stand at room temperature (about 25° C.) for 30 minutes. The odor of polymer 8 described later as a reference substance was rated as an odor level of 5. The relative odor level of a polymer in comparison with the reference substance was rated between 1 (weak odor) and 10 (strong odor). The sensory evaluation was performed by 10 or more persons, and an average odor level of 3.0 or less was considered excellent performance in practical use and an average odor level of 4.8 or less was considered sufficient performance in practical use.

6. Characteristics of Functional Group-Containing Polyphenylene Ether (Functional Group-Containing PPE)

(1) Number Average Molecular Weight

The molecular weight was measured with GPC (apparatus manufactured by WATERS, column: Shodex manufactured by Showa Denko K.K., solvent: chloroform) by subjecting a solution sample, in which 0.05 g of a functional group-containing PPE was dissolved in 50 g of chloroform, to an ultraviolet detector at a detection wavelength of polyphenylene ether, of 283 nm. In addition, the number average molecular weight was determined from the resulting GPC chromatogram by use of the calibration curve created with a commercially available standard monodisperse polystyrene having a known molecular weight.

(2) Rate of Maleic Anhydride Added

After 5 g of a functional group-containing PPE was dissolved in 100 ml of chloroform, the polymer was precipitated with dropping of 300 ml of acetone in small portions, and separated by filtration with a glass filter. After the operation was repeated three times, vacuum drying was performed in a vacuum drier at 140° C. for 2 hours. Next, 1 g of the functional group-containing PPE was taken and sandwiched between stacks in which a polytetrafluoroethylene sheet, an aluminum sheet and an iron plate were stacked in this order from the inside, and the resultant was subjected to compression molding at 100 kg/cm$^2$ by use of a press molding machine whose temperature was set at 280° C., to thereby provide a film. The resulting film was subjected to infrared spectrometry with an FT/IR-420 Fourier transform infrared spectrometer manufactured by JASCO Corporation.

In measurement of the functional group-containing PPE film, the peak derived from maleic acid added to polyphenylene ether was observed at 1790 cm$^{-1}$. The rate of maleic acid added (amount added based on 100 parts by weight of PPE: parts by weight), calculated from the calibration curve formula created in advance by use of a mixture of PPE and maleic acid, was determined.

7. Components and the Like of Polymer Composition (1) Component (a)—Thermoplastic Resin
Functional group-containing PPE
(2) Component (b)—Conjugated Diene-Based Polymer
Hydrogenated polymers: polymer 1, polymer 7, polymer 11, polymer 12
(3) Component (c)—Thermoplastic Resin
Polyamide 6: UBE Nylon 6-1013B (produced by Ube Industries. Ltd.)

Examples 1 and 6, Comparative Example 1, and Reference Example 2

Preparation of Polymer 1

A stirring apparatus having an inner volume of 12 L and a tank reactor equipped with a jacket were used to perform copolymerization in the order of polymerization operation steps described in Table 1. Loaded were 4600 g of cyclohexane purified, 0.69 g of tetrahydrofuran (THF), 0.69 g of tetramethylethylenediamine (TMEDA) and 132 g of styrene, and mixed and stirred at 100 rpm, and the polymerization initiation temperature was adjusted to 60° C. A 20% by weight n-butyl lithium solution (1.36 g of n-butyl lithium) in cyclohexane was added thereto to initiate polymerization of styrene. After completion of polymerization of styrene, 544 g of 1,3-butadiene was added and 1,3-butadiene was completely polymerized, and 124 g of styrene was added and styrene was completely polymerized.

Next, 3.15 g of 1,3-dimethyl-2-imidazolidinone (compound (III)) containing 0.12% by weight of 1,3-dimethyl- 2-imidazolinone corresponding to compound (II) was added, and 0.74 g of methanol was added after 15 minutes, to terminate polymerization.

To the resulting copolymer was added 130 ppm by weight of hydrogenation catalyst I as titanium based on the weight of the copolymer, and a hydrogenation reaction was performed at a hydrogen pressure of 0.7 MPa and at a temperature of 65° C. After completion of the reaction, 1 g of methanol was added to extract the polymer from the reactor. Next, 0.3% by weight of octadecyl-3-(3,5-di-t-butyl-4-hydroxyphenyl)propionate based on the weight of the polymer was added as a stabilizer. Furthermore, the resulting polymer rubber solution was dropped into boiling water with stirring to remove the solvent by steam stripping, thereby providing a crumb-like partially hydrogenated styrene/butadiene block copolymer rubber (polymer 1), and the resulting rubber was subjected to a drying treatment.

Preparation of Polymer 6 and Polymer 7

1,3-Dimethyl-2-imidazolidinone containing 0.6% by weight of 1,3-dimethyl-2-imidazolinone was used, and a stirring apparatus having an inner volume of 12 L and a tank reactor equipped with a jacket were used to perform copolymerization in the order of polymerization operation steps described in Table 1 in the same manner as in polymer 1. Characteristics of each of the resulting polymers are shown in Table 2.

Preparation of Polymer 12

The same copolymerization as in preparation of polymer 1 was performed except that 0.92 g of 1,3-dimethyl-2-imidazolidinone (compound (III)) containing 0.12% by weight of 1,3-dimethyl-2-imidazolinone was added. The order of polymerization steps is shown in Table 1, and characteristics of the resulting polymer are shown in Table 2.

It can be seen that the polymer of the present invention, having a value of (A)×(B) within a specified range, has an excellent color tone (polymers 1, 6 and 12). When the weight ratio (A) of the compound (II) to the total of the compound (II) and the compound (III) is high, the amounts of the compound (II) and the compound (III) to be added are decreased to thereby allow the value of (A)×(B) to be within a specified range, resulting in a reduction in b* value.

Example 2

Preparation of Polymer 2

A stirring apparatus having an inner volume of 100 L and a tank reactor equipped with a jacket were used to perform copolymerization in the order of polymerization operation steps described in Table 1. Loaded were 26800 g of cyclohexane purified, 4.0 g of tetrahydrofuran (THF) and 1440 g of styrene, and mixed and stirred at 100 rpm, and the polymerization initiation temperature was adjusted to 45° C. A 20% by weight n-butyl lithium solution (10.8 g of n-butyl lithium) in cyclohexane was added thereto to initiate polymerization of styrene. After completion of polymerization of styrene, 640 g of styrene and 1200 g of 1,3-butadiene were simultaneously added, 3600 g of 1,3-butadiene was continuously added, after 5 minutes thereof, over 10 minutes, styrene and 1,3-butadiene were completely copolymerized, 1120 g of styrene was added, and styrene was completely polymerized.

Next, 17.3 g of 1,3-dimethyl-2-imidazolidinone containing 0.12% by weight of 1,3-dimethyl-2-imidazolinone was added, and 4.84 g of methanol was added after 15 minutes, to terminate polymerization. To the resulting copolymer was added 100 ppm by weight of hydrogenation catalyst I as titanium based on the weight of the copolymer, and a hydrogenation reaction was performed at a hydrogen pressure of 0.7 MPa and at a temperature of 65° C. After completion of the reaction, 20 g of methanol was added to extract the polymer from the reactor. Next, 0.3% by weight of octadecyl-3-(3,5-di-t-butyl-4-hydroxyphenyl)propionate based on the weight of the polymer and 0.1% by weight of 2,4-bis(octylthiomethyl)-o-cresol based on the weight of the polymer were added as stabilizers. Furthermore, the resulting polymer rubber solution was dropped into boiling water with stirring to remove the solvent by steam stripping, thereby providing a crumb-like partially hydrogenated styrene/butadiene block copolymer rubber (polymer 2), and the resulting rubber was subjected to a drying treatment. Characteristics of the resulting polymer are shown in Table 2.

Example 3, Comparative Example 2

Preparation of Polymer 3

A stirring apparatus having an inner volume of 100 L and a tank reactor equipped with a jacket were used to perform copolymerization in the order of polymerization operation steps described in Table 1. Loaded were 29400 g of cyclohexane purified, 4.4 g of tetrahydrofuran (THF), 1.68 g of tetramethylethylenediamine, 720 g of styrene and 5040 g of 1,3-butadiene, and mixed and stirred at 100 rpm, and the polymerization initiation temperature was adjusted to 40° C. A 20% by weight n-butyl lithium solution (5.44 g of n-butyl lithium) in cyclohexane was added thereto to initiate polymerization. After completion of polymerization of styrene and 1,3-butadiene, 2240 g of styrene was added, and styrene was completely polymerized.

Next, 8.7 g of 1,3-dimethyl-2-imidazolidinone containing 0.5% by weight of 1,3-dimethyl-2-imidazolinone was added, and 2.3 g of methanol was added after 15 minutes, to terminate polymerization. To the resulting copolymer was added 100 ppm by weight of hydrogenation catalyst I as titanium based on the weight of the copolymer, and a hydrogenation reaction was performed at a hydrogen pressure of 0.7 MPa and at a temperature of 65° C. After completion of the reaction, 3 g of methanol was added to extract the polymer from the reactor. Next, 0.3% by weight of octadecyl-3-(3,5-di-t-butyl-4-hydroxyphenyl)propionate based on the weight of the polymer and 0.1% by weight of 2,4-bis(octylthiomethyl)-o-cresol based on the weight of the polymer were added as stabilizers. Furthermore, the resulting polymer rubber solution was dropped into boiling water with stirring to remove the solvent by steam stripping, thereby providing a crumb-like partially hydrogenated styrene/butadiene block copolymer rubber (polymer 3), and the resulting rubber was subjected to a drying treatment.

Preparation of Polymer 8

A stirring apparatus having an inner volume of 100 L and a tank reactor equipped with a jacket were used to perform copolymerization in the order of polymerization operation steps described in Table 1 in the same manner as in polymer 3 except that 10.7 g of 1,3-dimethyl-2-imidazolidinone containing 0.5% by weight of 1,3-dimethyl-2-imidazolinone was added. Characteristics of the resulting polymer are shown in Table 2.

Example 4 and Comparative Example 3

Preparation of Polymer 4

A stirring apparatus having an inner volume of 12 L and a tank reactor equipped with a jacket were used to perform copolymerization in the order of polymerization operation steps described in Table 1. Loaded were 4300 g of cyclohexane purified, 0.65 g of tetrahydrofuran (THF) and 704 g of 1,3-butadiene, and mixed and stirred at 100 rpm, and the polymerization initiation temperature was adjusted to 55° C. A 20% by weight n-butyl lithium solution (1.49 g of n-butyl lithium) in cyclohexane was added thereto to initiate polymerization. After completion of polymerization of 1,3-butadiene, 176 g of styrene was added, and styrene was completely polymerized.

Next, 2.12 g of 1,3-dimethyl-2-imidazolidinone containing 0.2% by weight of 1,3-dimethyl-2-imidazolinone was added, and 0.67 g of methanol was added after 15 minutes, to terminate polymerization. To the resulting copolymer was added 50 ppm by weight of hydrogenation catalyst II as titanium based on the weight of the copolymer, and a hydrogenation reaction was performed at a hydrogen pressure of 0.7 MPa and at a temperature of 65° C. After completion of the reaction, 1 g of methanol was added to extract the polymer from the reactor. Next, 0.3% by weight of octadecyl-3-(3,5-di-t-butyl-4-hydroxyphenyl)propionate based on the weight of the polymer and 0.1% by weight of 2,4-bis(octylthiomethyl)-o-cresol based on the weight of the polymer were added as stabilizers. Furthermore, the resulting polymer rubber solution was dropped into boiling water with stirring to remove the solvent by steam stripping, thereby providing a crumb-like partially hydrogenated styrene/butadiene block copolymer rubber (polymer 4), and the resulting rubber was subjected to a drying treatment.

Preparation of Polymer 9

1,3-Dimethyl-2-imidazolidinone containing 1.0% by weight of 1,3-dimethyl-2-imidazolinone was used, and a stirring apparatus having an inner volume of 12 L and a tank reactor equipped with a jacket were used to perform copolymerization in the order of polymerization operation steps described in Table 1 in the same manner as in polymer 4. Characteristics of the resulting polymer are shown in Table 2.

Example 5 and Comparative Example 4

Preparation of Polymer 5

A stirring apparatus having an inner volume of 12 L and a tank reactor equipped with a jacket were used to perform copolymerization in the order of polymerization operation steps described in Table 1. Loaded were 4000 g of cyclohexane purified, 0.60 g of tetrahydrofuran (THF) and 1100 g of 1,3-butadiene, and mixed and stirred at 100 rpm, and the polymerization initiation temperature was adjusted to 55° C. A 20% by weight n-butyl lithium solution (1.09 g of n-butyl lithium) in cyclohexane was added thereto to initiate polymerization. After completion of polymerization of 1,3-butadiene, 0.29 g of silicon tetrachloride was added thereto for partial coupling.

Next, 1.16 g of 1,3-dimethyl-2-imidazolidinone containing 0.5% by weight of 1,3-dimethyl-2-imidazolinone was added, and 0.33 g of methanol was added after 15 minutes, to terminate polymerization. To the resulting polymer was added 30 ppm by weight of hydrogenation catalyst I as titanium based on the weight of the polymer, and a hydrogenation reaction was performed at a hydrogen pressure of 0.7 MPa and at a temperature of 65° C. After completion of the reaction, 1 g of methanol was added to extract the polymer from the reactor. Next, 0.4% by weight of octadecyl-3-(3,5-di-t-butyl-4-hydroxyphenyl)propionate based on the weight of the polymer and 0.15% by weight of 2,4-bis(octylthiomethyl)-o-cresol based on the weight of the polymer were added as stabilizers. Furthermore, the resulting polymer rubber solution was dropped into boiling water with stirring to remove the solvent by steam stripping, thereby providing a crumb-like partially hydrogenated styrene/butadiene block copolymer rubber (polymer 5), and the resulting rubber was subjected to a drying treatment.

Preparation of Polymer 10

1,3-Dimethyl-2-imidazolidinone containing 1.0% by weight of 1,3-dimethyl-2-imidazolinone was used, and a stirring apparatus having an inner volume of 12 L and a tank reactor equipped with a jacket were used to perform polymerization in the order of polymerization operation steps described in Table 11 in the same manner as in polymer 5. Characteristics of the resulting polymer are shown in Table 2.

It can be seen from the results in Examples 1 to 6 and Comparative Examples 1 to 4 that each conjugated diene-based polymer (Examples 1 to 6) of the present invention has an excellent color tone.

Reference Example 1

Preparation of Polymer 11

A stirring apparatus having an inner volume of 12 L and a tank reactor equipped with a jacket were used to perform copolymerization in the order of polymerization operation steps described in Table 1. Loaded were 4600 g of cyclohexane purified, 0.69 g of tetrahydrofuran (THF), 0.69 g of tetramethylethylenediamine (TMEDA) and 132 g of styrene, and mixed and stirred at 100 rpm, and the polymerization initiation temperature was adjusted to 60° C. A 20% by weight n-butyl lithium solution (1.36 g of n-butyl lithium) in cyclohexane was added thereto to initiate polymerization of styrene. After completion of polymerization of styrene, 544 g of 1,3-butadiene was added and 1,3-butadiene was completely polymerized, and 124 g of styrene was added and styrene was completely polymerized. At 10 minutes after the temperature reached the peaking temperature in the styrene polymerization, 0.74 g of methanol was added to terminate the polymerization.

To the resulting copolymer was added 130 ppm by weight of hydrogenation catalyst I as titanium based on the weight of the copolymer, and a hydrogenation reaction was performed at a hydrogen pressure of 0.7 MPa and at a temperature of 65° C. After completion of the reaction, 1 g of methanol was added to extract the polymer from the reactor. Next, 0.3% by weight of octadecyl-3-(3,5-di-t-butyl-4-hydroxyphenyl)propionate based on the weight of the polymer was added as a stabilizer. Furthermore, the resulting polymer rubber solution was dropped into boiling water with stirring to remove the solvent by steam stripping, thereby providing a crumb-like partially hydrogenated styrene/butadiene block copolymer rubber (polymer 11), and the resulting rubber was subjected to a drying treatment.

Example 7, Comparative Example 5, Reference Example 3 and Reference Example 4

Preparation of Functional Group-Containing Polyphenylene Ether

Poly(2,6-dimethyl-1,4-phenylene ether) having a number average molecular weight of 22000 and having a phenolic hydroxyl group at one end chain of the polymer was synthesized, 1 part by weight of maleic anhydride based on 100 parts by weight of the polyphenylene ether was added thereto, and the resultant was melt-kneaded by a twin-screw extruder (ZSK-25 manufactured by WERNER&PFLEIDERER, Germany) equipped with a vent port heated to 250 to 300° C., and extruded with the unreacted maleic anhydride being removed under reduced pressure, to provide a functional group-containing polyphenylene ether (functional group-containing PPE) to which 0.4 parts by weight of maleic anhydride was added.

In a production process where (a) a functional group-containing polyphenylene ether (functional group-containing PPE) and (b) a hydrogenated conjugated diene-based polymer were continuously fed through a first feed port of an extruder and thereafter (c) polyamide 6 (UBE Nylon 6-1013B) was continuously fed through a second feed port located at the center of the extruder according to the compounding formulation shown in Table 3, melt-kneading was performed with a twin-screw extruder (ZSK-25 manufactured by WERNER&PFLEIDERER, Germany) equipped with a vent port set at 300° C., to provide a composition as a pellet. The pellet was fed to an injection molding machine (IS55EPN manufactured by Toshiba Machine Co, Ltd.) set at 240 to 300° C., and injection-molded into a test piece and a flat plate (50 mm×90 mm×2.5 mm) for the Izod impact test in a condition of a mold temperature of 60° C. to 100° C. It can be seen that the polymer composition using the conjugated diene-based polymer of the present invention is high in impact strength and has an excellent color tone (Example 7). Polymer 7 (Comparative Example 5) with the amounts of the compounds (II) and (III) to be added being out of the range of the present invention is high in b* value, and the polymer composition using polymer 11 (Reference Example 3) with no amino group of a specified structure at an end thereof and the polymer composition using polymer 12 (Reference Example 4) with 35% of the end thereof being modified are poor in impact strength.

TABLE 1

| Order of polymerization operation steps | | | Polymer 1 | Polymer 2 | Polymer 3 | Polymer 4 | Polymer 5 | Polymer 6 |
|---|---|---|---|---|---|---|---|---|
| Polymerization before hydrogenation (base polymer) | (Reactor) | | 12 L | 100 L | 100 L | 12 L | 12 L | 12 L |
| | Cyclohexane | | 4600 g | 26800 g | 29400 g | 4300 g | 4000 g | 4600 g |
| | THF | | 0.69 g | 4.0 g | 4.4 g | 0.65 g | 0.60 g | 0.69 g |
| | TMEDA | | 0.69 g | — | 1.68 g | — | — | 0.69 g |
| | Styrene | | 132 g | 1440 g | 720 g | — | — | 132 g |
| | 1,3-Butadiene | | — | — | 5040 g | 704 g | 1100 g | — |
| | n-BuLi | | 1.36 g | 10.8 g | 5.44 g | 1.49 g | 1.09 g | 1.36 g |
| | Styrene/Butadiene | | — | 640/1200 g | — | — | — | — |
| | 1,3-Butadiene | | 544 g | 3600 g | — | — | — | 544 g |
| | Styrene | | 124 g | 1120 g | 2240 g | 176 g | — | 124 g |
| | Coupling agent (SiCl4) | | — | — | — | — | 0.29 g | — |
| | Nitrogen-containing cyclic compound ((II) + (III)) | | 3.15 g | 17.3 g | 8.7 g | 2.12 g | 1.16 g | 1.21 g |
| | (A) = ((II)/((II) + (III))) × 100 | wt % | 0.12 | 0.12 | 0.5 | 0.2 | 0.5 | 0.6 |
| | (B) = ([(II)] + [(III)])/[Li] | Relative to Li (molar ratio) | 1.3 | 0.9 | 0.9 | 0.8 | 0.6 | 0.5 |
| | (A) × (B) | | 0.156 | 0.108 | 0.45 | 0.16 | 0.3 | 0.3 |
| | Methanol | | 0.74 g | 4.84 g | 2.3 g | 0.67 g | 0.33 g | 0.61 g |
| Hydrogenation | Hydrogenation catalyst | ppm/ Amount of rubber | 130 | 100 | 100 | 50 | 30 | 150 |
| | Amount of hydrogen | L | 340 | 2000 | 3000 | 180 | 200 | 350 |

| Order of polymerization operation steps | | | Polymer 7 | Polymer 8 | Polymer 9 | Polymer 10 | Polymer 11 | Polymer 12 |
|---|---|---|---|---|---|---|---|---|
| Polymerization before hydrogenation (base polymer) | (Reactor) | | 12 L | 100 L | 12 L | 12 L | 12 L | 12 L |
| | Cyclohexane | | 4600 g | 29400 g | 4300 g | 4000 g | 4600 g | 4600 g |
| | THF | | 0.69 g | 4.4 g | 0.65 g | 0.60 g | 0.69 g | 0.69 g |
| | TMEDA | | 0.69 g | 1.68 g | — | — | 0.69 g | 0.69 g |
| | Styrene | | 132 g | 720 g | — | — | 132 g | 132 g |
| | 1,3-Butadiene | | — | 5040 g | 704 g | 1100 g | — | — |
| | n-BuLi | | 1.36 g | 5.44 g | 1.49 g | 1.09 g | 1.36 g | 1.36 g |
| | Styrene/Butadiene | | — | — | — | — | — | — |
| | 1,3-Butadiene | | 544 g | — | — | — | 544 g | 544 g |
| | Styrene | | 124 g | 2240 g | 176 g | — | 124 g | 124 g |
| | Coupling agent (SiCl4) | | — | — | — | 0.30 g | — | — |
| | Nitrogen-containing cyclic compound ((II) + (III)) | | 2.42 g | 10.7 g | 2.12 g | 1.16 g | — | 0.92 g |
| | (A) = ((II)/((II) + (III))) × 100 | wt % | 0.6 | 0.5 | 1 | 1 | — | 0.12 |

TABLE 1-continued

|  |  |  | | | | | | |
|---|---|---|---|---|---|---|---|---|
| | (B) = ([(II)] + [(III)])/[Li] | Relative to Li (molar ratio) | 1 | 1.1 | 0.8 | 0.6 | — | 0.38 |
| | (A) × (B) | | 0.6 | 0.55 | 0.8 | 0.6 | — | 0.046 |
| | Methanol | | 0.61 g | 2.3 g | 0.67 g | 0.30 g | 0.74 g | 0.74 g |
| Hydrogenation | Hydrogenation catalyst | ppm/ Amount of rubber | 130 | 100 | 50 | 30 | 130 | 130 |
| | Amount of hydrogen | L | 360 | 3000 | 200 | 220 | 340 | 340 |

TABLE 2

| | | | Example 1 | Example 2 | Example 3 | Example 4 | Example 5 | Example 6 |
|---|---|---|---|---|---|---|---|---|
| | Polymer | | Polymer 1 | Polymer 2 | Polymer 3 | Polymer 4 | Polymer 5 | Polymer 6 |
| Characteristics of polymer before hydrogenation | Content of styrene | wt % | 32 | 40 | 37 | 16 | 0 | 32 |
| | Amount of vinyl of polybutadiene portion before hydrogen added | wt % | 35 | 18 | 24 | 13 | 15 | 36 |
| | Peak molecular weight | | 78000 | 90000 | 190000 | 150000 | Coupling portion 520000 | 80000 |
| | Coupling portion | wt % | — | — | — | — | 44 | — |
| | (A) = ((II)/((II) + (III))) × 100 | wt % | 0.12 | 0.12 | 0.5 | 0.2 | 0.5 | 0.6 |
| | (B) = ([(II)] + [(III)])/[Li] | Relative to Li (molar ratio) | 1.3 | 0.9 | 0.9 | 0.8 | 0.6 | 0.5 |
| | (A) × (B) | | 0.156 | 0.108 | 0.45 | 0.16 | 0.3 | 0.3 |
| | Rate (I) of amino group of specified structure at end | % | 84 | 83 | 84 | 70 | 53 | 48 |
| Characteristics of hydrogenated polymer | b* value (1) of hydrogenated polymer after drying and finishing | | 5.5 | 3.8 | 11.8 | 5.8 | 8.7 | 9.1 |
| | b* value (2) of hydrogenated polymer after drying and finishing | | 7.1 | 4.6 | 14.9 | 7.2 | 10.8 | 12.8 |
| | Amount of hydrogen added of polybutadiene portion (hydrogenation rate) | % | 88 | 35 | 48 | 27 | 27 | 83 |
| | Rate (II) of amino group of specified structure at end after hydrogen added | % | 74 | 78 | 68 | 61 | 47 | 40 |
| | Retention of rate of amino group of specified structure at end after hydrogen added ((II)/(I)) × 100 | % | 88.1 | 94.0 | 81.0 | 87.1 | 88.7 | 83.3 |
| | Odor sensoly evaluation | | 2.8 | 3.3 | 4.8 | 3.5 | 4.3 | 3.1 |

| | | | Comparative Example 1 | Comparative Example 2 | Comparative Example 3 | Comparative Example 4 | Reference Example 1 | Reference Example 2 |
|---|---|---|---|---|---|---|---|---|
| | Polymer | | Polymer 7 | Polymer 8 | Polymer 9 | Polymer 10 | Polymer 11 | Polymer 12 |
| Characteristics of polymer before hydrogenation | Content of styrene | wt % | 32 | 37 | 16 | 0 | 32 | 32 |
| | Amount of vinyl of polybutadiene portion before hydrogen added | wt % | 35 | 25 | 13 | 15 | 35 | 35 |
| | Peak molecular weight | | 81000 | 180000 | 140000 | Coupling portion 510000 | 78000 | 78000 |
| | Coupling portion | wt % | — | — | — | 48 | — | — |
| | (A) = ((II)/((II) + (III))) × 100 | wt % | 0.6 | 0.5 | 1 | 1 | — | 0.12 |
| | (B) = ([(II)] + [(III)])/[Li] | Relative to Li (molar ratio) | 1 | 1.1 | 0.8 | 0.6 | — | 0.38 |
| | (A) × (B) | | 0.6 | 0.55 | 0.8 | 0.6 | — | 0.046 |
| | Rate (I) of amino group of specified structure at end | % | 86 | 88 | 73 | 55 | — | 35 |
| Characteristics of hydrogenated polymer | b* value (1) of hydrogenated polymer after drying and finishing | | 18.2 | 16.5 | 21.6 | 15.9 | 3.8 | 4.1 |
| | b* value (2) of hydrogenated polymer after drying and finishing | | 22.8 | 20.7 | 27.1 | 20.1 | 5.4 | 4.9 |
| | Amount of hydrogen added of polybutadiene portion (hydrogenation rate) | % | 87 | 51 | 27 | 28 | 89 | 87 |
| | Rate (II) of amino group of specified structure at end after hydrogen added | % | 68 | 74 | 58 | 45 | — | 33 |

TABLE 2-continued

| | | | | | | | |
|---|---|---|---|---|---|---|---|
| Retention of rate of amino group of specified structure at end after hydrogen added ((II)/(I)) × 100 | % | 79.1 | 84.1 | 79.5 | 81.8 | — | 94.3 |
| Odor sensoly evaluation | | 5.8 | 5.0 | 7.3 | 6.3 | 1.8 | 2.5 | b* value (1): b* value measured in a sheet feeding sample at a roll gap of 3 mm after roll drying
b* value (2): b* value measured in a sample formed by heat-pressing (150° C. for 5 minutes) a sample after roll drying, in a mold of a flat plate of 3 mm in thickness

TABLE 3

| | | Example 7 | Comparative Example 5 | Reference Example 3 | Reference Example 4 |
|---|---|---|---|---|---|
| Hydrogenated conjugated diene-based polymer <Extruder TOP FEED: first feed port> | | Polymer 1 | Polymer 7 | Polymer 11 | Polymer 12 |
| Functional group-containing PPE | (parts by mass) | 40 | 40 | 40 | 40 |
| Hydrogenated conjugated diene-based polymer <Extruder TOP FEED: second feed port> | (parts by mass) | 10 | 10 | 10 | 10 |
| Ube Nylon 6-1013B <Physical properties of composition> | (parts by mass) | 50 | 50 | 50 | 50 |
| Izod ⅛ inches in thickness, notched | (kg · cm/cm) | 87 | 81 | 46 | 56 |
| b* value of flat plate of 2.5 mm in thickness | | 6.2 | 12.7 | 3.6 | 4.4 |

Extruder ZSK-25
Extruder temperature: front stage 300° C., rear stage 300° C.
Amount discharged: 15 Kg/Hr (TOP FEED 7.5 Kg/Hr, SIDE FEED 7.5 Kg/Hr)

INDUSTRIAL APPLICABILITY

The conjugated diene-based polymer according to the present invention has an excellent color tone, 40% or more of the end thereof has an amino group and an amide group, and a composition of the conjugated diene-based polymer with other polymer substance such as a thermoplastic resin or a rubber polymer is excellent in appearance properties such as color tone and mechanical properties such as impact resistance and fabricability. The conjugated diene-based polymer can be extended, by means of characteristics thereof, to applications of food packaging materials, medical equipment materials, home electric appliances and components thereof, electronic devices and components thereof, automobile components, industrial components, household appliances, materials for toys and the like, materials for footwear, materials for viscous adhesives/adhesives, asphalt modifiers, and the like.

The invention claimed is:
1. A method for producing a conjugated diene-based polymer, comprising:
a step of polymerizing a monomer including at least one conjugated diene monomer by use of an organolithium compound as an initiator, and
a step of adding a compound (II) represented by the following formula (II) and a compound (III) represented by the following formula (III):

wherein $R_3$ and $R_4$ each independently represent a hydrocarbon group having 1 to 20 carbon atoms; and wherein $R_5$ and $R_6$ each independently represent a hydrocarbon group having 1 to 20 carbon atoms;
wherein when a weight ratio (%) of the compound (II) to a total of the compound (II) and the compound (III) is defined as (A) as shown by formula 1 and a molar ratio of the compound (II) and the compound (III) to lithium of the polymerization initiator is defined as (B) as shown by formula 2, amounts of the polymerization initiator, the compound (II) and/or the compound (III) to be added are regulated so that (A)×(B) is 0.5 or less as shown by formula 3:

$(A)$ = (Compound (II)/(Compound (II)+Compound (III)))×100     Formula 1:

$(B)$ = ([Compound (II)]+[Compound (III)])/[Li]     Formula 2:

$(A)\times(B) \leq 0.5$     Formula 3.

2. The method according to claim 1, wherein the conjugated diene-based polymer comprises at least one conjugated diene monomer, wherein 40% or more of an end thereof is an end having an amino group and an amide group, and an indicator b* value of yellowness, as measured with a colorimetric color difference meter, is 15 or less,
wherein the end having the amino group and the amide group comprises an end having a structure represented by the following formula (I):

wherein P represents a conjugated diene-based polymer comprising at least one conjugated diene monomer, and R₁ and R₂ each independently represent a hydrocarbon group having 1 to 20 carbon atoms.

3. The method according to claim 2, wherein the end having the amino group and the amide group comprises an end having a structure represented by the following formula (I) and an end having a structure represented by the following formula (IV), and the indicator b* value of yellowness, as measured with a colorimetric color difference meter, is 15 or less:

(I)

wherein P represents a conjugated diene-based polymer comprising at least one conjugated diene monomer, and R₁ and R₂ each independently represent a hydrocarbon group having 1 to 20 carbon atoms; and (IV)

wherein P represents a conjugated diene-based polymer comprising at least one conjugated diene monomer, and R₁ and R₂ each independently represent a hydrocarbon group having 1 to 20 carbon atoms.

4. The method according to claim 2, wherein the b* value is 9 or less.

5. A polymer composition comprising:
(a) 1 to 99 parts by weight of a conjugated diene-based polymer obtained by the method according to claim 1, and
(b) 99 to 1 part by weight of a thermoplastic polymer and/or a rubber polymer.

6. The method according to claim 1, wherein $R_3$ and $R_4$ each independently represent a hydrocarbon group having 1 to 8 carbon atoms.

7. The method according to claim 1, wherein $R_5$ and $R_6$ each independently represent a hydrocarbon group having 1 to 8 carbon atoms.

8. The method according to claim 1, wherein $R_3$ and $R_4$ each independently represent a group selected from the group consisting of an alkyl group, a cycloalkyl group, an alkenyl group, an alkynyl group and an aryl group.

9. The method according to claim 1, wherein $R_5$ and $R_6$ each independently represent a group selected from the group consisting of an alkyl group, a cycloalkyl group, an alkenyl group, an alkynyl group and an aryl group.

10. The method according to claim 1, wherein the organolithium compound is selected from the group consisting of ethyl lithium, n-propyl lithium, isopropyl lithium, n-butyl lithium, sec-butyl lithium, tert-butyl lithium, hexamethylene lithium, butadienyl dilithium and isoprenyl dilithium.

11. The method according to claim 1, wherein the polymerizing step is performed at a temperature from −10 to 150° C.

12. The method according to claim 1, wherein the compound (II) is selected from the group consisting of 1,3-diethyl-2-imidazolinone, 1,3-dimethyl-2-imidazolinone, 1,3-dipropyl-2-imidazolinone, 1-methyl-3-ethyl-2-imidazolinone, 1-methyl-3-propyl-2-imidazolinone, 1-methyl-3-butyl-2-imidazolinone and 1,3-dihydro-1,3-dimethyl-2H-imidazol-2-one.

13. The method according to claim 1, wherein the compound (III) is selected from the group consisting of 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-propyl-2-imidazolidinone and 1-methyl-3-butyl-2-imidazolidinone.

* * * * *